United States Patent
Brown et al.

(10) Patent No.: US 10,397,650 B1
(45) Date of Patent: Aug. 27, 2019

(54) ENCODING AND DECODING MEDIA CONTENTS USING CODE SEQUENCE TO ESTIMATE AUDIENCE

(71) Applicant: comScore, Inc., Reston, VA (US)

(72) Inventors: Michael A. Brown, Ashburn, VA (US); Magid M. Abraham, Great Falls, VA (US)

(73) Assignee: comScore, Inc., Reston, VA (US)

( * ) Notice: Subject to any disclaimer, the term of this patent is extended or adjusted under 35 U.S.C. 154(b) by 61 days.

(21) Appl. No.: 15/040,152

(22) Filed: Feb. 10, 2016

Related U.S. Application Data (60) Provisional application No. 62/114,704, filed on Feb. 11, 2015.

(51) Int. Cl.
*H04N 21/44* (2011.01)
*H04N 21/439* (2011.01)
*H04N 21/442* (2011.01)
*H04N 21/8358* (2011.01)

(52) U.S. Cl.
CPC ... *H04N 21/44204* (2013.01); *H04N 21/4394* (2013.01); *H04N 21/44008* (2013.01); *H04N 21/8358* (2013.01)

(58) Field of Classification Search
CPC ........... H04N 21/4394; H04N 21/8358; H04N 21/44204; H04N 21/44008
See application file for complete search history.

(56) References Cited

U.S. PATENT DOCUMENTS

| | | | | |
|---|---|---|---|---|
| 5,450,490 A | * | 9/1995 | Jensen | H04H 20/31 380/241 |
| 2004/0064319 A1 | * | 4/2004 | Neuhauser | G10L 19/018 704/273 |
| 2005/0235318 A1 | * | 10/2005 | Grauch | G06Q 30/02 725/46 |

* cited by examiner

*Primary Examiner* — Kunal Langhnoja
(74) *Attorney, Agent, or Firm* — Baker & Hostetler LLP (57) ABSTRACT

Systems and methods for estimating media audience are disclosed. In one aspect, a method includes receiving a media signal to be transmitted via a media distribution system, the media signal including multiple pieces of media content that each contain video and audio signals. One of the multiple pieces of media content within the received media signal are identified. It is determined that the identified piece of media content exceeds a threshold length, and, in response to determining that the identified piece of media content exceeds a threshold length, the audio signal of the identified piece of media content is encoded with a sequence of discrete codes. Each discrete code has a period that includes a set of sequential frequency components imperceptible to humans. The threshold length is greater than the period of a discrete code multiplied by the number of discrete codes in the sequence.

17 Claims, 6 Drawing Sheets

ENCODING AND DECODING MEDIA CONTENTS USING CODE SEQUENCE TO ESTIMATE AUDIENCE

CROSS-REFERENCE TO RELATED APPLICATION

This application claims the benefit of U.S. Provisional Application No. 62/114,704, filed Feb. 11, 2015, the contents of which are incorporated by reference.

BACKGROUND OF THE INVENTION

The present invention relates to system and methods for watermarking a piece of media content prior to transmission, and subsequently using the watermark in the transmitted media content to determine that a particular user has been exposed to the media content.

Over the years, various technologies have been developed to encode media content with humanly imperceptible information signals to provide indications of authorship, content, copyright, or the like in the media contents so encoded. These technologies have been generally referred to as "watermarking" and have found broad applications in the area of audience measurement.

SUMMARY

The present disclosure relates to computer-implemented methods, software, and systems for identifying media content through watermarking. In accordance with a first aspect, an encoder is provided for encoding a piece of audio content with a sequence of discrete codes that accumulatively identifies the piece of audio content. The encoder includes a component for receiving a piece of audio content to be transmitted via a media distribution system. The encoder further includes a component for watermarking the audio content with a sequence of discrete codes that are imperceptible to humans, each code having a plurality of frequency components and being encoded into the audio content over a set period such that the set period multiplied by the number of discrete codes does not exceed the length of the audio content. The encoder further repeats the watermarking process through the entire length of the audio content to ensure that a sufficient quantity of code frequency components can be detected later by a monitoring device to recover the sequence of discrete codes.

In accordance with another aspect, an encoder is provided for encoding a piece of video content with a sequence of discrete codes that accumulatively identifies the piece of video content. The encoder further includes a component for watermarking the video content with a sequence of discrete codes that are imperceptible to humans, each code having a plurality of frequency components and being encoded into the video content over a set period such that the set period multiplied by the number of discrete codes does not exceed the length of the video content. The encoder further repeats the watermarking process through the entire length of the video content to ensure that a sufficient quantity of code frequency components can be detected later by a monitoring device to recover the sequence of discrete codes.

In accordance with another aspect, a monitoring unit is provided for receiving at least a portion of the encoded audio or video content and decoding the received portion of the content to retrieve the sequence of discrete codes. The monitoring unit further comprises a component for transmitting the retrieved sequence of discrete codes for analysis.

In accordance with a further aspect, a collection server is provided for receiving the transmitted sequence of discrete codes retrieved by the monitoring unit and for determining, based on the receipt of the transmitted sequence of codes, that a viewer associated with the monitor unit was exposed to the media program containing the audio or video content identified by the sequence of discrete codes.

Other implementations of these aspects include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by a data processing apparatus, cause the apparatus to perform the actions.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

This disclosure generally relates to systems and methods for encoding the content of a media program with a sequence of discrete codes that accumulatively identify the media program and subsequently detecting the presence of the identification information when the media program is consumed by audience members to estimate how many people are exposed to the media program. In certain implementations, each of the sequence of discrete codes is represented by a set of frequency components, which, when incorporated into the media content, are made imperceptible to human audience through well-known digital watermarking techniques. In certain other implementations, the system encodes multiple segments of the mediacontent with the same sequence of discrete codes to ensure that a sufficient quantity of frequency components representing each code can be detected by a monitoring unit to recover the entire sequence of discrete codes.

Figure 1:
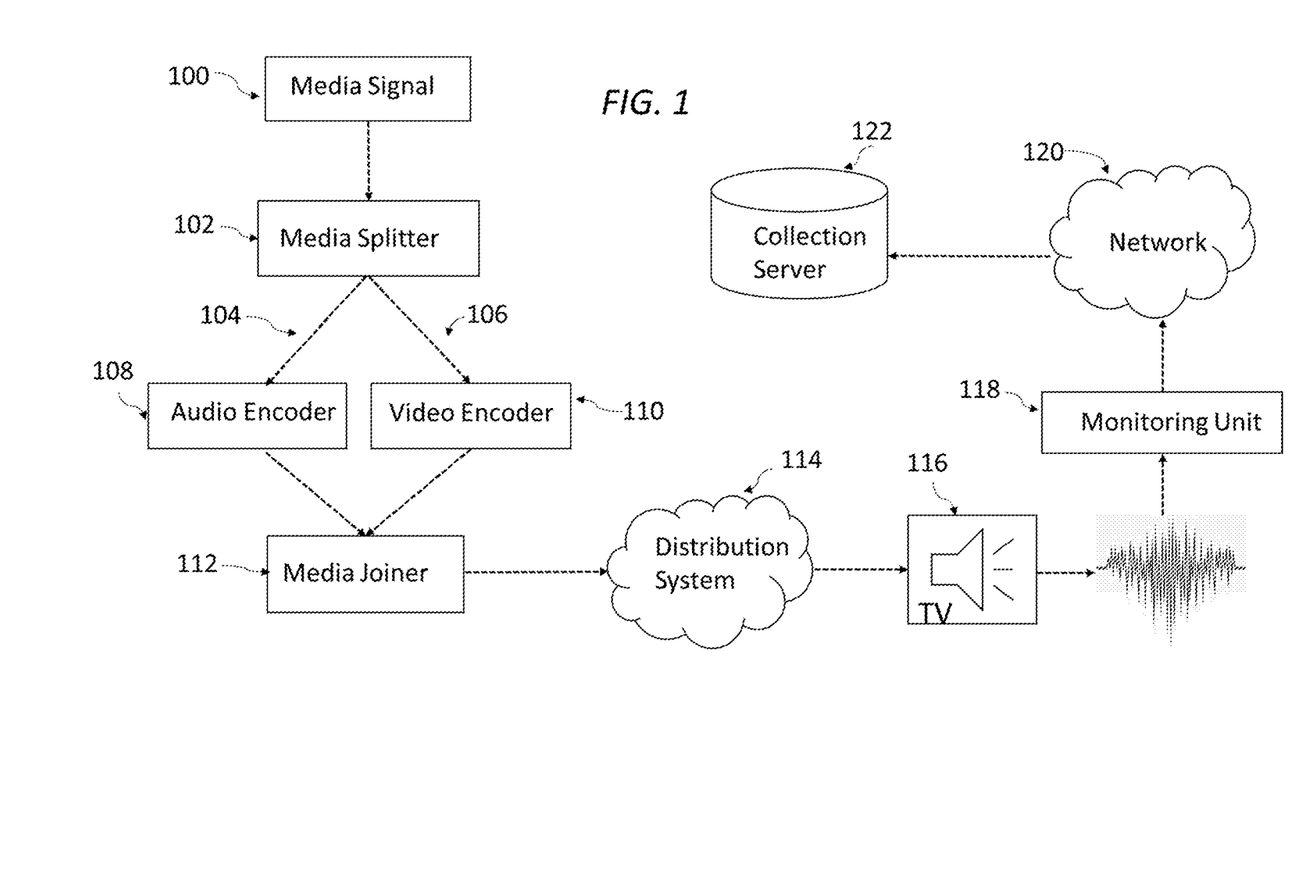
FIG. 1 is a block diagram illustrating an example system for identifying media content through watermarking.

FIG. 1 is a block diagram illustrating an example media system for identifying media content through digital watermarking. Media signal 100 comprises an audio component 104 and a video component 106, both of which can be obtained from the output of a media splitter 102. An audio encoder 108 coupled with the media splitter receives the audio component 104 and encodes its content with a sequence of discrete codes that accumulatively identify the audio content. Similarly, a video encoder 110 may be coupled with the medial splitter to receive the video component 106 and encode its content with a sequence of discrete codes that accumulatively identify the video content. The encoded audio component 104 and the video component 106 are then re-combined via a media joiner 112 and transmitted through a distribution system 114 before being played on a multimedia receiver unit (e.g., a television set 116). When a viewer carrying a monitoring unit 118 is within a receiving range of a broadcast of the audio of the media program, the monitoring unit 118 records and decodes the audio content to retrieve the sequence of discrete codes embedded in the audio content that identify the media program. A similar monitoring device (not shown in the figure) may also be utilized to receive and decode the video content of the media program to retrieve the sequence of discrete codes embedded in the video content that identify the medial program. Such a video monitoring device may be embedded in the multimedia receiver unit or coupled to it by wired or wireless connection means. The audio or video monitoring unit 118 stores the identification information and periodically transmits the identification information (i.e., the sequence of discrete codes) along with other relevant data (e.g., the monitoring unit's own identifier, the time, and/or the location), over a network 120 to a collection server 122. The collection server 122 examines the transmitted sequence of codes and other relevant information to determine that a viewer associated with the reporting monitoring unit was exposed to the piece of media content.

The audio component 104 described above can be in many forms. For instance, the audio component 104 can be in a compressed or uncompressed format. The audio component 104 can also be previously encoded or unencoded. Similarly, the video component 106 can also come in many forms.

The distribution system 114 can be an over-the-air TV broadcasting system, a cable TV network, a data network, or any other suitable type of transmission media.

The receiver unit 116 can be a television set as shown in FIG. 1. It can also be a radio, a computer, a mobile device, a digital media streaming device, or any other type of device capable of receiving media content over the distribution system 114.

The monitoring unit 118 can be a portable device worn by selected audience members. Or, the monitoring unit can be a stationary device placed in people's homes. Any other types of devices capable of receiving and decoding media signals (e.g., mobile devices, personal computers, set-top boxes, tablets, digital media streaming devices, etc.) may be used in place of the monitoring unit 116 to accomplish the processes described herein.

The network 120 can be a data network such as the Internet. Alternatively, the network 120 can be a cellular telephone network. Depending on the type of network utilized, the monitoring unit 118 is capable of transmitting the information it has received and recorded using the appropriate network protocols.

The collection server 122 can be one computer device or it can a cluster of computer devices. The collection server 122 is responsible for collecting audience measurement information from multiple monitoring units 118. In certain implementations, the collection server 122 is also responsible for analyzing the collected data and generating reports reflecting the results of the analysis. Additionally or alternatively, the collection server 122 maintains a database for storing the collected data and the reports. The foregoing functionalities may be implemented with software programs or a combination of software and hardware components.

Figure 2:
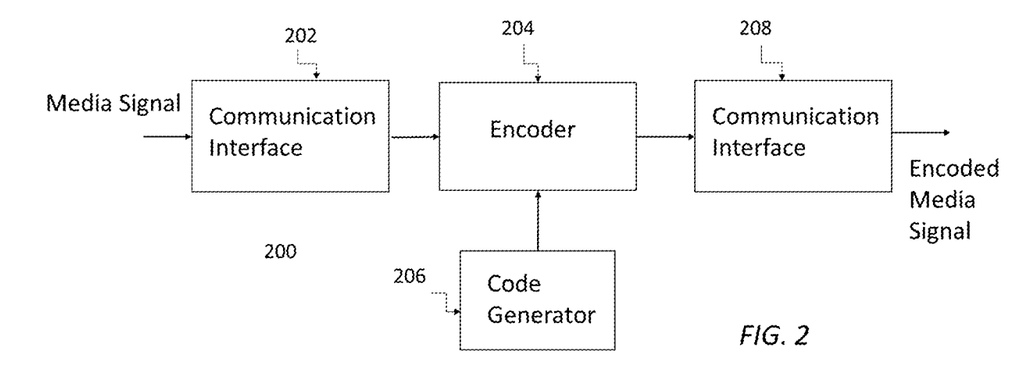
FIG. 2 is a block diagram illustrating an example media encoder.

FIG. 2 is a block diagram illustrating an example media encoder 200, which may be used, for example, as the audio encoder 108 or video encoder 110 illustrated in FIG. 1. For illustrative purposes, the encoder device 200 will be described as including a communication interface 202, an encoder 204, a code symbol generator 206, and a communication interface 208. However, the audio encoder 200 may include more or fewer components for achieving the same functionality described with regard to the components 202, 204, 206, and 208.

A media signal enters the encoder device 200 through the communication interface 202. The media signal then goes through a number of preliminary operations carried out by encoder 204. In some implementations, the preliminary operations include evaluating the masking ability of the media signal and determining the length of the media signal. Techniques for evaluating the masking ability of a media signal are well known in the art and therefore not further explained herein.

Once the encoder 204 completes the preliminary operations, it proceeds to encode the media signal with a sequence of discrete codes produced by the code generator 206. Code generation may be carried out in a variety of different ways and will be further explained in the sections below. The encoded media signal is then communicated via the communication interface 208 to downstream devices and systems (e.g., media joiner 112 and distribution system 114 described above with regard to FIG. 1), which transmit the encoded media signal to a receiver unit (e.g., receiver unit 116 described above with regard to FIG. 1).

Importantly, the encoder 204 and code generator 206 may be initially designed with certain constraints in light of various design criteria (e.g., cost, equipment capabilities, initial intended usage, etc.). For example, where the initial intended usage of an encoder is to identify a limited number of pieces of media content, the code generator 206 may only be designed to generate a correspondingly limited number of codes. However, once the encoder device 200 has been produced and deployed within a media system such as that described in FIG. 1, demands on the usage of the encoder device 200 may exceed the initial design criteria. In the example regarding identification of a limited number of pieces of media content, the number pieces of media content may increase with time. Additionally or alternatively, the manner in which the media content may change with the needs of users within the media system.

Given the cost of designing, producing, and deploying encoder devices within a media system, it can be difficult to make updates to encoder devices themselves. Moreover, significant alteration to the manner in which an encoder device operates may additionally require updates to other devices within a media system that interact directly or indirectly with the encoder device (e.g., monitoring units 118). Accordingly, the systems and methods described herein alter the manner of utilizing existing encoder devices to expand or otherwise alter the capabilities of the media system without the need to alter the encoder device or monitoring units themselves.

Figure 3A:
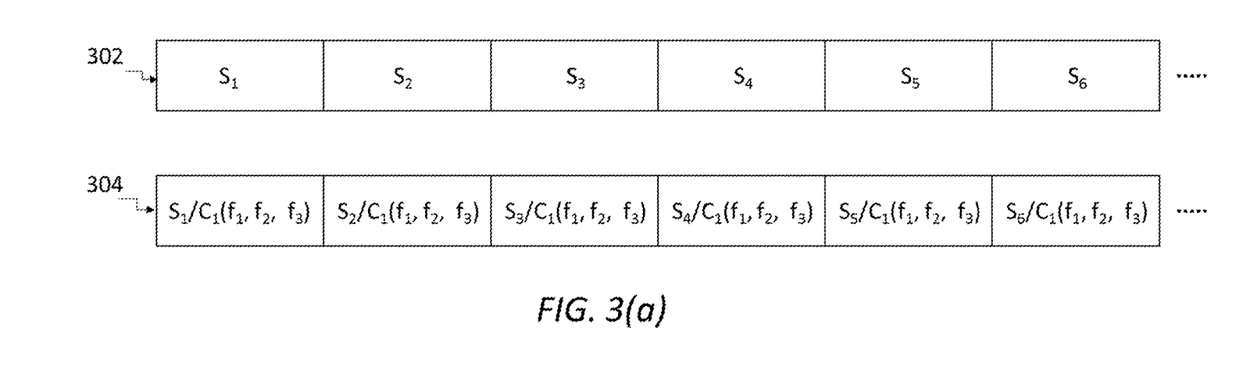
FIGS. 3(a) and 3(b) are timing diagrams illustrating methods for watermarking an audio or video signal associated with media content.
Figure 3B:
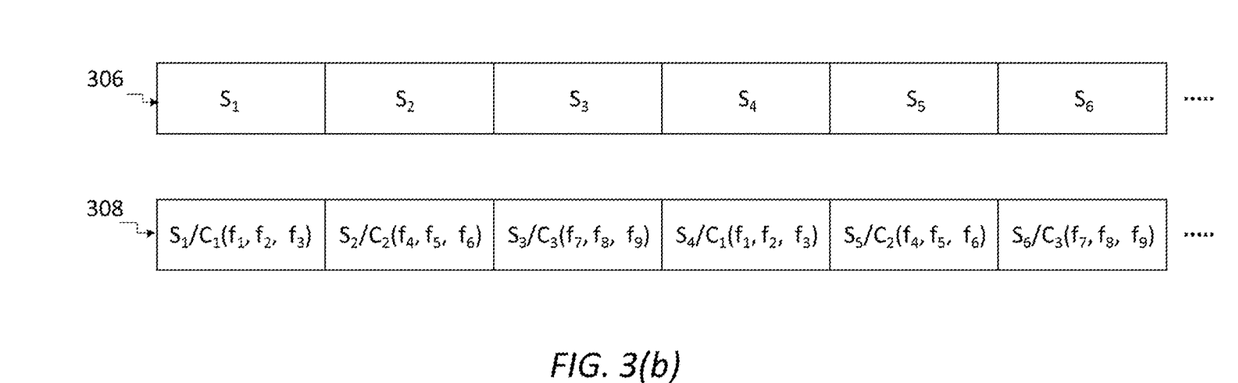
Figure 4:
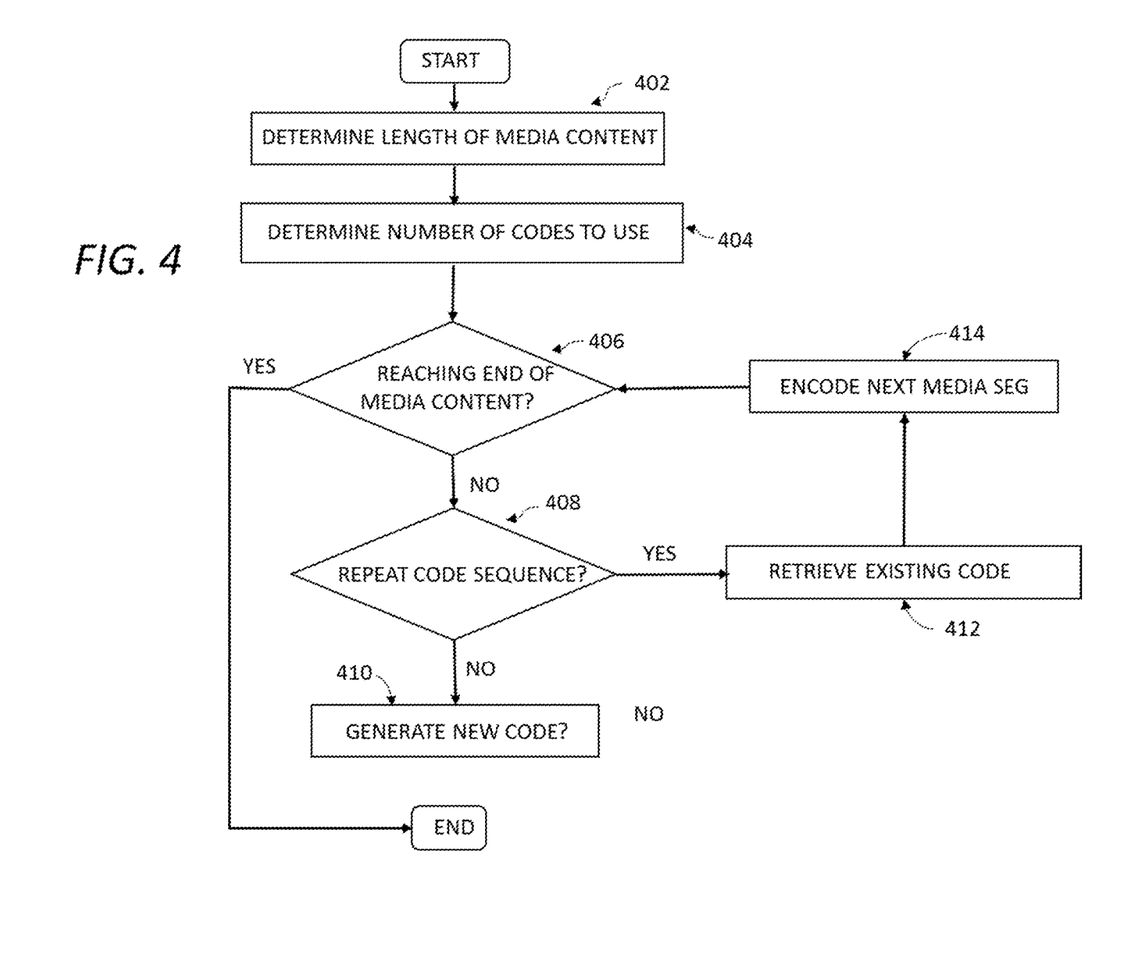
FIG. 4 is a flow chart of an example process for identifying media content through watermarking.

FIGS. 3(a), 3(b) and 4 illustrate example encoding processes in accordance with certain implementations of the media system described above. A first process is illustrated in FIG. 3(a).

As shown in FIG. 3(a), an audio signal 302 comprising multiple segments $S_1, S_2, S_3 \ldots$ is received by an encoding device for encoding. The encoding device maintains a predefined set of ID codes, where each ID code is related to one or more pieces of media content to which the audio signal belongs. Upon receiving the audio signal 302, the encoding device identifies the media content to which the audio signal is associated and retrieves an ID code $C_1$ from the predefined set of ID codes that represent the identified media content. The ID code $C_1$ is further represented by a set of one or more humanly imperceptible frequency components $f_1, f_2, f_3 \ldots$. The encoder device embeds the humanly imperceptible frequency components of the ID code $C_1$ into one segment, e.g., $S_1$, of the audio signal 302 so that when received and extracted by a monitoring unit, the frequency components can be used to determine that an audience member is exposed to the media content associated with audio signal 302. To ensure that a sufficient quantity of the frequency components of the ID code $C_1$ can be detected by the monitoring unit to recover the ID code $C_1$, the encoder device embeds the ID code $C_1$ into multiple remaining segments (e.g., S2, S3 . . . ) of the audio signal 302 to produce an encoded audio signal 304, which is then transmitted to a receiver device.

As discussed earlier, encoding devices utilizing the technique illustrated in FIG. 3(a) may be constrained by the fact that the number of predefined ID codes is limited. For instance, an example audio encoder employing the foregoing technique may have a predefined set of approximately 56,000 unique codes. While 56,000 codes may provide ample identifiers for media content under an original design specification (e.g., identifying limited advertising campaigns in a traditional television system), this number of codes may not adequately adapt to tagging all commercial-related media content (e.g., commercials or ads) in a more advance time-shifted viewing system involving video-on-demand (VOD) and digital video recorder (DVR) devices. Therefore, it may be desirable to develop new methods for utilizing an existing audio encoder to expand its capabilities.

FIG. 3(b) illustrates an example of an alternative technique of encoding with an audio encoder. In the example illustrated in FIG. 3(b), a segment of media content may be identified by more than one ID code, as opposed to the single repeated ID code described with regard to FIG. 3(a). In particular, an audio signal 306 comprising multiple segments S1, S2, S3 . . . is received by an encoding device for encoding. Upon receiving the audio signal 306, the encoding device identifies the media content to which the audio signal is associated and retrieves multiple ID codes that represent the identified media content. In the example shown in FIG. 3(b), identified media content is represented with three ID codes; however any number of ID codes may be used.

The encoding device uses the retrieved first ID code $C_1$ of the predefined set of codes and encodes a first segment, $S_1$, of the audio signal 306 with the ID code $C_1$. The ID code $C_1$ is represented by a first set of humanly imperceptible frequency components $f_1, f_2, f_3 \ldots$. Next, in contrast to the previously described implementation of embedding the same ID code $C_1$ into multiple remaining segments of the audio signal 306, the encoding device encodes the next segment of the audio signal 306 with a second retrieved ID code, $C_2$, from the predefined set of codes. The second ID code $C_2$ is represented by a second set of humanly imperceptible frequency components $f_4, f_5, f_6 \ldots$. Subsequently, the encoding device may encode a third segment, $S_3$, of the audio signal 306, with a retrieved third ID code, $C_3$, from the predefined set of codes. The third ID code $C_3$ is represented by a third set of humanly imperceptible frequency components $f_7, f_8, f_9 \ldots$. As described above, the audio encoder may retrieve any number of multiple ID codes to meet the evolving needs of the media system.

It should be apparent from the descriptions above that the alternative encoding technique described with regard to FIG. 3(b) exponentially increases the number of identifiers that can be used to identify and encode audio signals. More specifically, in an original audio encoding device as described with regard to FIG. 3(a) and having a predefined set of 56,000 ID codes, only 56,000 identifiers are available for uniquely identifying and encoding media content. With the alternative technique described with regard to FIG. 3(b), using the same predefined set of 56,000 ID codes, a total number of 175,616,000,000,000 (i.e., $56,000^3$) identifiers can be used to uniquely identify and encode different media content. This is because instead of using one ID code to identify an audio signal, a combination of three codes is used to accumulatively identify the audio signal.

Depending on the length of the audio signal of the media content, the audio encoding device may be configured to repeatedly encode the audio signal with the set of ID codes to increase the likelihood that a monitoring unit is able to successful retrieve and decode the ID codes from the audio content. Thus, in certain implementations, the sequence of discrete codes described with regard to FIG. 3(b) (i.e., $C_1$, $C_2$ and $C_3$) are further embedded into multiple remaining segments (e.g., $S_4, S_5, S_6$) of the audio signal 306 to produce an encoded audio signal 308. The repetitive presence of the sequence of discrete codes ensures that a sufficient quantity of the frequency components of the ID codes $C_1$, $C_2$ and $C_3$ can be detected by the monitoring unit to recover the sequence of codes.

In certain implementations, the encoding is configured to continuously monitor the time consumed by the encoding process such that the encoding can be completed within the length of audio signal 306.

Although the alternative encoding process has been described above in the context of audio signals, it should be apparent from the foregoing that the same techniques may be implemented to encode video signals in order to expand the capabilities of watermarking videos to similar effect.

FIG. 4 is a flow chart of an example process for watermarking a piece of media content using the alternative encoding technique described above. At 402, the encoding device determines the length of the media content submitted for encoding. Based on the length of the media content and an estimated time period for embedding each code into the media content, the encoding device determines, at 404, the number of discrete codes to be used for encoding the medial content. For instance, if embedding one code takes 2.4 seconds and the media content is 30 seconds long, the encoding device may decide to use a sequence of three codes, which takes a total of 7.2 seconds, leaving enough time to repeat the encoding process multiple times within the duration of the media content to ensure signal quality. In certain implementations, the calculation of the content length also takes into consideration the existence of white space that may not be able to be encoded.

Starting at 406, the encoding device engages in a repetitive loop to encode the multiple segments of the media content with codes produced by the code generator 206 shown in FIG. 2. At the beginning of each iteration, the encoding device checks whether it has reached the end of the media content. If it has, the encoding process completes. Otherwise, the encoding device determines, at 408, whether it should get a new code or repeat the code sequence already used in previous iterations. To get a new code, the encoding device activates the code generator 206 at 410. To re-use a code, the encoding device, at 412, retrieves the code from a memory location or a similar device where the code has been stored since its last use in a previous iteration. Next, at 414, the encoding device encodes the next media segment with either the new code or the existing code. The process repeats with 406 to 414 until the end of the media content is reached. Accordingly, FIG. 4 illustrates that in certain implementations, the sequence of discrete codes used to accumulatively identify the media signal are further embedded into multiple remaining segments of the media signal.

It should be apparent from the discussions above that the number of discrete codes used to uniquely identify an audio signal is not limited to a particular value. In certain implementations, two codes may be used; in certain other implementations, three or even more codes may be used. A key factor to consider when determining how many codes should be used is the length of the audio signal and the time it takes to finish encoding each code.

It should also be apparent from the foregoing that the same techniques may be implemented to encode both audio and video signals in order to expand the capabilities of watermarking those signals.

Figure 5:
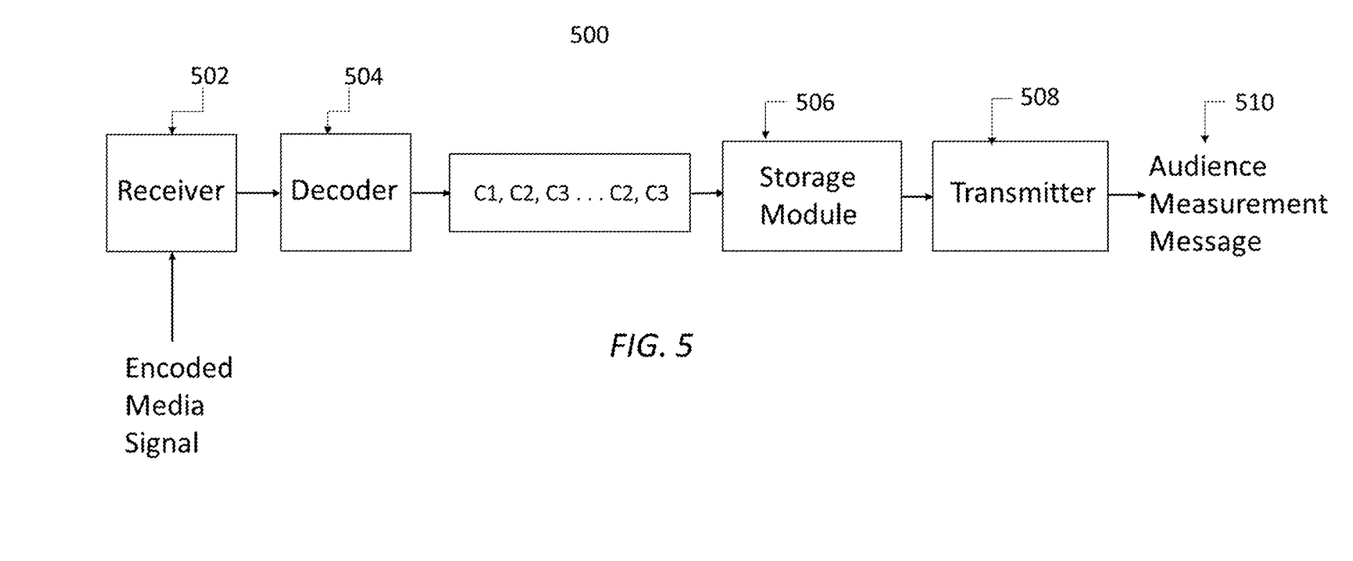
FIG. 5 is a block diagram illustrating an example media decoder.

FIG. 5 provides an overview of an example decoding process carried out by a monitoring unit 500. In this example, the monitoring unit 500 comprises a receiver 502, a decoder 504, a storage module 512, and a transmitter 514. However, the monitoring unit may include more or fewer components and carry out the same or similar functionality. Upon receiving an encoded media signal via the receiver 502, the monitoring unit 500 activates the decoder 504 to extract the sequence of discrete codes embedded in the media signal. Upon retrieving the sequence of codes (e.g., C1, C2, C3, etc.) the monitoring unit 500 records the retrieved codes in the storage unit 506. Subsequently, the monitoring unit 500 transmits the retrieved codes via the transmitter 508 in an audience measurement message 510 to a collection server. In certain implementations, monitoring unit 500 may transmit additional information with the retrieved codes, such as identifying information of the monitoring unit 500, a time at which each code was decoded from the received media signal, and/or a location of the monitoring unit.

Importantly, the monitoring unit 500 need not be aware of the number of ID codes used to identify a segment of media content. Rather, the monitoring unit 500 may simply be configured to continuously monitor media signals received via the monitoring unit's receiver 502 (e.g., a microphone) and attempt to decode ID codes in the received signals. When the monitoring unit encounters an ID code, the monitoring unit decodes the ID code, stores the ID code in the storage module 512, and continues monitoring the received signals.

Figure 6:
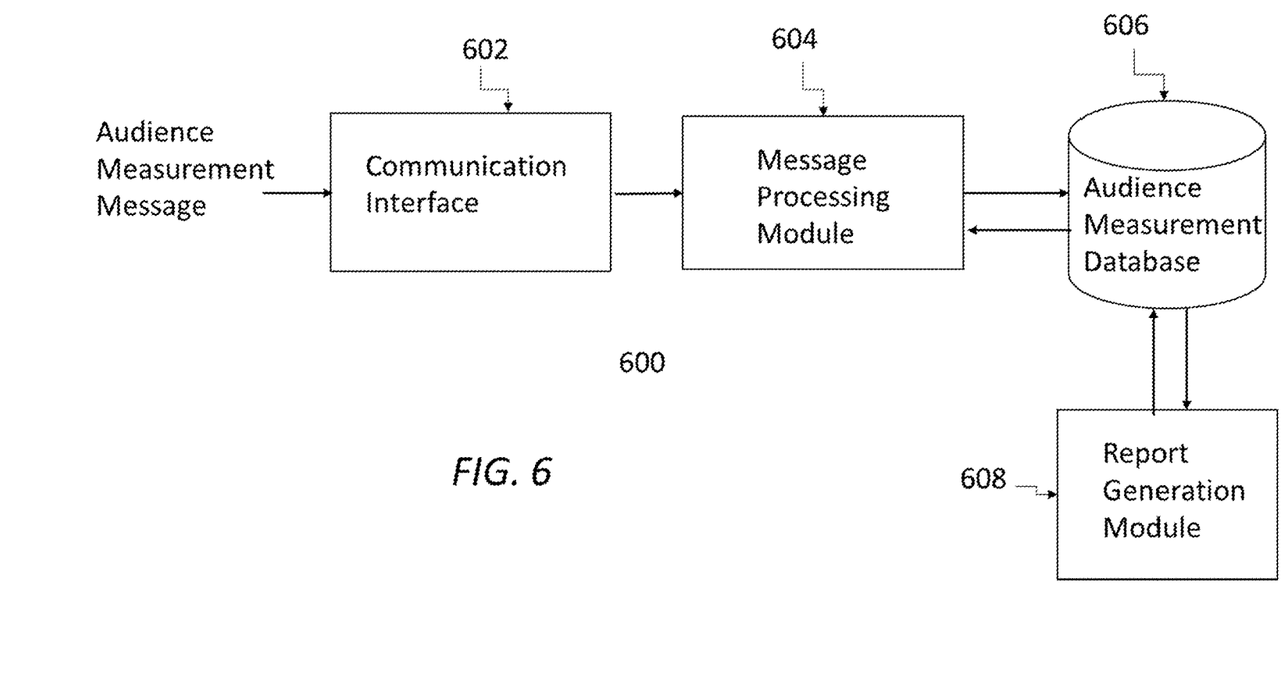
FIG. 6 is a block diagram illustrating an example collection server.

FIG. 6 provides an overview of an example collection server 600. The collection server 600 may comprise a communication interface 602, a message processing module 604, an audience measurement database 606, and a report generation module 608. However, the collection server may include more or fewer components and carry out the same or similar functionality. The collection server 600 receives audience measurement messages from various monitoring units via the communication interface 602. The message processing module 604 examines the messages to identify the sequences of discrete codes reported by each monitoring unit. In certain implementations, the mapping relationship between media content and sequences of discrete codes are predetermined and stored in the audience measurement database 606. The message processing module 604 compares each sequence of discrete codes identified from the audience measurement messages against the mapping information stored in the audience measurement database to determine that an audience member associated with a particular monitoring unit was exposed to a specific piece of media content. The message processing module 604 then assembles the audience measurement information thus gathered into the audience measurement database 606. The information can then be used by the report generation module 608 to produce reports of audience measurement for certain media content. In implementations, the reports thus generated may in return be saved in the audience measurement database 606.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

The invention claimed is:

1. A system, comprising:
   an encoder configured to:
      receive a media signal to be transmitted via a media distribution system, the media signal including multiple pieces of media content that each contain at least one of audio signals or video signals,
      identify one of the multiple pieces of media content within the received media signal,
      determine a length of the identified piece of media content,
      determine, based on the length of the identified piece of media content, a sequence of discrete codes capable of being inserted into the identified piece of media content, the sequence of discrete codes comprising a first discrete code and a second discrete code, the first discrete code having a period comprising a first set of sequential frequency components imperceptible to humans, the second discrete code having a period comprising a second set of sequential frequency components imperceptible to humans, and the first set of sequential frequency components having different frequencies than the second set of sequential frequency components,
      wherein the sequence of discrete codes comprises multiple repetitions of the first code and the second code, wherein the multiple repetitions of the first code and the second code comprises alternating repetitions of the first code and the second code, and
      wherein the length of the identified piece of media content is greater than the period of the first discrete code multiplied by a number of first discrete codes in the sequence and the period of the second discrete code multiplied by a number of second discrete codes in the sequence, and
      encode the identified piece of media content with the sequence of discrete codes, wherein the sequence of discrete codes identifies the piece of media content.

2. The system of claim 1, wherein the encoder is configured to select the discrete codes in the sequence of discrete codes from a limited set of available codes.

3. The system of claim 2, wherein each discrete code in the sequence of discrete codes is a different code from the limited set of available codes.

4. The system of claim 1, wherein the length of the identified piece of media content is at least twice as great as the period of the first discrete code multiplied by the number of first discrete codes in the sequence and the period of the second discrete code multiplied by the number of second discrete codes in the sequence, and the encoder is further configured to encode the audio signal of the identified piece of media content with the sequence of discrete codes at least twice.

5. The system of claim 1, further comprising a monitoring unit associated with a viewer of media content, the monitoring unit being configured to:
receive at least a portion of the transmitted audio or video signal, the received portion of the audio or video signal having been output from a media receiver system,
decode the received portion of the transmitted audio or video signal to retrieve the sequence of discrete codes that identifies the media content, and
cause the retrieved sequence of discrete codes to be transmitted for analysis.

6. The system of claim 5, further comprising a collection server configured to:
receive the transmitted sequence of discrete codes retrieved by the monitoring unit, and
based on the receipt of the transmitted sequence of discrete codes, determine that the viewer of media content associated with the monitoring unit was exposed to the piece of media content identified by the sequence of discrete codes.

7. A method for estimating media audience, the method comprising:
receiving a media signal to be transmitted via a media distribution system, the media signal including multiple pieces of media content that each contain video and audio signals,
identifying one of the multiple pieces of media content within the received media signal,
determining a length of the identified piece of media content,
determining, based on the length of the identified piece of media content, a sequence of discrete codes capable of being inserted into the identified piece of media content, the sequence of discrete codes comprising a first discrete code and a second discrete code, the first discrete code having a period comprising a first set of sequential frequency components imperceptible to humans, the second discrete code having a period comprising a second set of sequential frequency components imperceptible to humans, and the first set of sequential frequency components having different frequencies than the second set of sequential frequency components,
wherein the sequence of discrete codes comprises multiple repetitions of the first code and the second code, wherein the multiple repetitions of the first code and the second code comprises alternating repetitions of the first code and the second code, and wherein the length of the identified piece of media content is greater than the period of the first discrete code multiplied by a number of first discrete codes in the sequence and the period of the second discrete code multiplied by a number of second discrete codes in the sequence, and
encoding the identified piece of media content with the sequence of discrete codes, wherein the sequence of discrete codes identifies the piece of media content.

8. The method of claim 7, wherein the discrete codes are selected from a limited set of available codes.

9. The method of claim 8, wherein each discrete code in the sequence of discrete codes is a different code from the limited set of available codes.

10. The method of claim 7, wherein the length of the identified piece of media content is at least twice as great as the period of the first discrete code multiplied by the number of first discrete codes in the sequence and the period of the second discrete code multiplied by the number of second discrete codes in the sequence, and the audio signal of the identified piece of media content is encoded with the sequence of discrete codes at least twice.

11. The method of claim 7, further comprising:
receiving, at a monitoring unit associated with a viewer of media content, at least a portion of the transmitted audio or video signal, the received portion of the audio or video signal having been output from a media receiver system,
decoding, at the monitoring unit, the received portion of the transmitted audio or video signal to retrieve the sequence of discrete codes that identifies the media content, and
causing, at the monitoring unit, the retrieved sequence of discrete codes to be transmitted for analysis.

12. The method of claim 11, further comprising:
receiving, at a collection server, the transmitted sequence of discrete codes retrieved by the monitoring unit, and
based on the receipt of the transmitted sequence of discrete codes, determining at the collection server that the viewer of media content associated with the monitoring unit was exposed to the piece of media content identified by the sequence of discrete codes.

13. A non-transitory computer-readable storage device having instructions stored thereon that, when executed by a computer system, instruct the computer system to carry out operations including:
receiving a media signal to be transmitted via a media distribution system, the media signal including multiple pieces of media content that each contain video and audio signals,
identifying one of the multiple pieces of media content within the received media signal,
determining a length of the identified piece of media content,
determining, based on the length of the identified piece of media content, a sequence of discrete codes capable of being inserted into the identified piece of media content, the sequence of discrete codes comprising a first discrete code and a second discrete code, the first discrete code having a period comprising a first set of sequential frequency components imperceptible to humans, the second discrete code having a period comprising a second set of sequential frequency components imperceptible to humans, and the first set of sequential frequency components having different frequencies than the second set of sequential frequency components,
wherein the sequence of discrete codes comprises multiple repetitions of the first code and the second code, wherein the multiple repetitions of the first code and the second code comprises alternating repetitions of the first code and the second code, and wherein the length of the identified piece of media content is greater than the period of the first discrete code multiplied by a number of first discrete codes in the sequence and the period of the second discrete code multiplied by a number of second discrete codes in the sequence, and encoding the identified piece of media content with the sequence of discrete codes, wherein the sequence of discrete codes identifies the piece of media content.

14. The non-transitory computer-readable storage device of claim 13, wherein the discrete codes are selected from a limited set of available codes.

15. The non-transitory computer-readable storage device of claim 14, wherein each discrete code in the sequence of discrete codes is a different code from the limited set of available codes.

16. The non-transitory computer-readable storage device of claim 13, wherein the length of the identified piece of media content is at least twice as great as the period of the first discrete code multiplied by the number of first discrete codes in the sequence and the period of the second discrete code multiplied by the number of second discrete codes in the sequence, and the audio signal of the identified piece of media content is encoded with the sequence of discrete codes at least twice.

17. The non-transitory computer-readable storage device of claim 13, wherein the instructions, when executed by the computer system, further instruct the computer system to carry out operations including:
- receiving, at a monitoring unit associated with a viewer of media content, at least a portion of the transmitted audio or video signal, the received portion of the audio or video signal having been output from a media receiver system,
- decoding, at the monitoring unit, the received portion of the transmitted audio or video signal to retrieve the sequence of discrete codes that identifies the media content, and
- causing, at the monitoring unit, the retrieved sequence of discrete codes to be transmitted for analysis.

\* \* \* \* \*